United States Patent [19]
Sato et al.

[11] Patent Number: 5,594,562
[45] Date of Patent: Jan. 14, 1997

[54] HAND-WRITABLE POLYMER DISPERSED LIQUID CRYSTAL BOARD SET WITH HIGH RESISTANCE LAYER ADJACENT CONDUCTIVE LAYER

[75] Inventors: Morio Sato, Fujisawa; Yutaka Abe, Hiratsuka; Jun Takano, Chigasaki; Hirokazu Ishii, Kamakura; Yasuzo Murata, Kanagawa-ken, all of Japan

[73] Assignee: Kabushiki Kaisha Pilot, Tokyo-to, Japan

[21] Appl. No.: 191,792

[22] Filed: Feb. 1, 1994

Related U.S. Application Data

[63] Continuation-in-part of Ser. No. 8,735, Jan. 25, 1993, Pat. No. 5,351,143.

[30] Foreign Application Priority Data

Feb. 7, 1992 [JP] Japan .................................. 4-56088
Apr. 2, 1992 [JP] Japan ................................. 4-108372

[51] Int. Cl.[6] ........................ G02F 1/1335; G02F 1/1333
[52] U.S. Cl. ............................................. 349/12; 349/86
[58] Field of Search ................................ 359/52, 74, 83, 359/51; 345/179

[56] References Cited

U.S. PATENT DOCUMENTS

| | | | |
|---|---|---|---|
| 4,125,319 | 11/1978 | Frank et al. | 350/362 |
| 4,435,047 | 3/1984 | Fergason | 359/51 |
| 4,525,032 | 6/1985 | Hilsum | 359/84 |
| 4,603,945 | 8/1986 | Fergason | 359/52 |
| 4,606,611 | 8/1986 | Fergason | 359/52 |
| 4,616,903 | 10/1986 | Fergason | 359/52 |
| 4,643,528 | 2/1987 | Bell, Jr. | 359/52 |
| 4,671,618 | 6/1987 | Wu et al. | 359/52 |
| 4,685,771 | 8/1987 | West et al. | 359/51 |
| 4,688,900 | 8/1987 | Doane et al. | 359/52 |
| 4,701,024 | 10/1987 | Kobayashi et al. | 350/331 |
| 4,707,080 | 11/1987 | Fergason | 359/52 |
| 4,911,536 | 3/1990 | Ditzik | 350/351 |
| 4,931,019 | 6/1990 | Park | 434/409 |
| 5,087,387 | 2/1992 | Mullen et al. | 252/299.5 |
| 5,111,316 | 5/1992 | Nobile et al. | 359/52 |
| 5,115,330 | 5/1992 | Nobile et al. | 359/52 |
| 5,117,297 | 5/1992 | Nobile et al. | 359/52 |
| 5,136,404 | 8/1992 | Nobile et al. | 359/52 |

FOREIGN PATENT DOCUMENTS

| | | |
|---|---|---|
| 3737721 | 5/1989 | Germany . |
| 55-96922 | 7/1980 | Japan . |
| 61-83521 | 4/1986 | Japan . |
| 3-43715 | 2/1991 | Japan . |
| 3-156489 | 7/1991 | Japan . |
| 4-362916 | 12/1992 | Japan . |

OTHER PUBLICATIONS

Patent Abstracts of Japan, vol. 015, No. 188, May 15, 1991, for JP 03–043715.
Patent Abstracts of Japan, vol. 013, No. 172, Apr. 24, 1989, for JP 01–006929.
Patent Abstracts of Japan, vol. 012, No. 138, Apr. 27, 1988, for JP 62–258430.
Patent Abstracts of Japan, vol. 015, No. 391, Oct. 3, 1991, for JP 03–156489.

*Primary Examiner*—Anita Pellman Gross
*Attorney, Agent, or Firm*— Darby & Darby

[57] ABSTRACT

The liquid crystal display device of the externally charging type in accordance with present invention, includes a layered structure with: in the following order, a conductive layer; a transparent high-electric resistance layer having the thickness of 0.1 to 50 µm and having a volume resistivity of $10^{13}$ Ω.cm or more in 20° C. air at a relative humidity of 90%; a liquid crystal-dispersed polymer layer in which liquid crystal is finely dispersed in a polymermatrix and which has a volume resistivity of $10^{13}$ Ω.cm or more in 20° C. air at a relative humidity of 90%; and a transparent insulator layer. The liquid crystal display may be incorporated into a hand-writable liquid crystal board set which further includes: display means for displaying recording images onto the board surface of the liquid crystal board, and erasing means for erasing the recorded images; and a power source for generating a surface potential between the surface of the liquid crystal board and the conductive layer by the display means.

18 Claims, 6 Drawing Sheets

HAND-WRITABLE POLYMER DISPERSED LIQUID CRYSTAL BOARD SET WITH HIGH RESISTANCE LAYER ADJACENT CONDUCTIVE LAYER

This is a continuation-in-part of U.S. application Ser. No. 08/008,735 filed Jan. 25, 1993, now U.S. Pat. No. 5,351,143.

BACKGROUND OF THE INVENTION

1. Field of the Invention

The present invention relates to a liquid crystal display device of externally charging type and a hand-writable liquid crystal board set including the device. More specifically, the present invention relates to a hand-writable liquid crystal board set comprising: a liquid crystal display device of externally charging type in which the display or erasing of an image is carried out by varying the state of light scattering in the liquid crystal using electro-optical effects, or the provision or removal of static electric charges; display means to display an image on a board screen; erasing means for erasing the recorded image; and a power source for generating a surface potential on the board screen using the display means.

2. Description of the Related Art

Many proposals have already been made relating to liquid crystal display devices using electro-optical effects, such as the current effect, electric field effect, or heat effect of liquid crystals. Of these, a liquid crystal display device disclosed in Japanese Patent Application Laid-Open No.(sho) 55-96922, comprises a pair of transparent conductive layers, and a liquid crystal-dispersed polymer layer sandwiched therebetween in which micro-capsules hermetically holding liquid crystal therein are scattered. Since this liquid crystal display device effects the display by varying the alignment of liquid crystal by turning on and off the application of an electric field between electrodes, it is possible to easily obtain a large-sized display screen with a simple structure. Nevertheless, this display device requires use of polarizing plates, thus exhibiting drawbacks such as a dark display image and a narrow field of view.

U.S. Pat. No. 4,435,047 as well as Japanese-translated PCT Patent Application Laid-Open No.(sho) 63-501512, discloses a liquid crystal display device which has a simple structure with no polarizing plate, thereby the above drawbacks are eliminated, and which facilitates the provision of a large-sized display screen. For this purpose the liquid crystal display device includes a pair of transparent electrodes, and a liquid crystal-dispersed polymer layer sandwiched between the electrodes in which liquid crystal is finely dispersed in the polymer matrix. The liquid crystal display device having such a structure, however, cannot be applied to a so called externally charging type liquid crystal display, in which recording and erasing can be effected from the outside surface of the display screen.

As an improvement in this respect, Japanese Patent Application Laid-open Nos.(sho) 61-83521 and (hei) 3-43715 disclose a liquid crystal display device comprising a liquid crystal-dispersed polymer layer in which liquid crystal is finely dispersed in the polymer matrix and a conductive layer is coated in a layer thereon; and an image display method in which a recording image is formed by providing static charges on the display screen from the outside of the liquid crystal-dispersed polymer layer (of the display screen) and thus changing the phase and/or alignment of the liquid crystal.

However, none of these liquid crystal display apparatus described heretofore would allow the hand-writing or erasure of images on the display screen from the outside of the liquid crystal display device.

A liquid crystal display apparatus disclosed in Japanese Patent Application Laying-Open No.(sho) 61-83521, performs display and erasing of the recorded image by providing or removing static charges in a form of corona charge flow from the outside of the display screen of the liquid crystal display device. The present inventors have investigated the liquid crystal display apparatus of this kind, and have found that the provision of electric charges to the display screen could cause the cholesteric liquid crystal to change its phase to form a recording image, but the removal of the static charges could not bring back the phase-changed cholesteric liquid crystal to the initial state, or could not erase the recorded image. In order to erase the recorded image, it was found that the liquid crystal must be heated above the phase transition temperature, or be further provided with an electrically conductive sheet through which an a.c. electric field can be applied. It was also found that, for repetitions of display, the remaining static charges must be removed to effect the next display. In sum, it was found that complicated operations were required to display and erase recorded images repeatedly.

In a liquid crystal display device disclosed in Japanese Patent Application Laid-Open No.(hei) 3-43715, if electric charges are provided to the display screen from the outside by any of various charging techniques, the liquid crystal is aligned and this changes the state of light scattering in the liquid crystal display device to display a recorded image. This disclosure teaches that, to erase the recorded image thus obtained, it is necessary to provide opposite electric charges equivalent to the amount of the static charges present in the area of the recorded image. In practice, however, it is very difficult to perform such an operation since the amount of the opposite charges may be slightly more or less than that of the static charges. This situation makes the erasing operation difficult. Moreover, the disclosed apparatus disadvantageously exhibits shortness of memory retention of the recorded image in 20° C. air at a relative humidity of 90% or under an environment of high humidity.

Some hand-writable liquid crystal board sets have been manufactured utilizing the above described liquid crystal display apparatuses, but for the reasons described above the devices are unsatisfactory. In other words, the former apparatus needs complicated display and erasing processes to repeatedly display images and erase them, or is problematic in its handling and performances. For the latter apparatus, erasing of the recorded image is not feasible, the liquid crystal board is not durable, and its memory retention of the recorded images under a high humidity environment is not satisfactory. For these reasons, it has been impossible to obtain a hand-writable liquid crystal board having good operativity and sufficient durability and performance.

SUMMARY OF THE INVENTION

The present invention has been achieved to eliminate the problems in the above discussed prior art, and it is therefore an object of the present invention to provide a liquid crystal display device of the externally charging type which readily provides a display screen for a large sized display apparatus with a simple structure, which permits recording and erasing from the outside of a display screen, has excellent memory retention of the recorded images, and which has practical strength such as heat resistance, etc. when used as a display board. A further object of the present invention is to provide a hand-writable liquid crystal board set including the above liquid crystal display device as a liquid crystal board, which provides excellent operativity, performance and safety. Specifically, the present invention is to provide a hand-writable liquid crystal board set which can be used, for example, as a toy or in the education field, and therefore, which can be used with safety and practical utility and which would give no harmful effect even if, in recording or erasing by handwriting a coating material, a conductive lead member connected to a power source to make an electrical contact is broken and the conductive lead member is brought into direct contact with any part of human body.

The present inventors have intensively studied the hand-writable liquid crystal board set to achieve the above objects. As a result, they found that a liquid crystal device and a hand-writable liquid crystal board set having a constitution as follows can provide operativity, performance satisfying practical utility, and have completed the invention.

The liquid crystal display of the externally charging type of the present invention can be characterized by the following:

(1) The liquid crystal display device of externally charging type in accordance with the present invention comprises: a conductive layer; a transparent high-electric resistance layer having a thickness of 0.1 to 50 μm and a volume resistivity of $10^{13}$ Ω.cm or more in 20° C. air at a relative humidity of 90%; a liquid crystal-dispersed polymer layer, in which liquid crystal is finely dispersed in polymer matrix thereof, said layer having a volume resistivity of $10^{13}$ Ω.cm or more in 20° C. air at a relative humidity of 90%; and a transparent insulator layer having a volume resistivity of $10^{13}$Ω.cm or more in 20° C. air at a relative humidity of 90%; wherein all of the layers are successively layered in the order presented.

(2) The liquid crystal display device of externally charging type according to item 1, wherein said high-electric resistance layer comprises a polymer having a cross-linked structure or a polymer film.

(3) The liquid crystal display device of externally charging type according to item 1, wherein the polymer matrix of said liquid crystal-dispersed polymer layer is composed of a polymer having a cross-linked structure.

The hand-writable liquid crystal board set of the present invention can be characterized by the following fourth item to fourteenth item.

(4) The hand-writable liquid crystal board set in accordance with the present invention comprises:

(A) a liquid crystal board of externally charging type comprising: a conductive layer, a transparent high-electric resistance layer having a thickness of 0.1 to 50 μm and a volume resistivity of $10^{13}$ Ω.cm or more in 20° C. air at a relative humidity of 90%, a liquid crystal-dispersed polymer layer in which liquid crystal is finely dispersed in a polymer matrix, said layer having a volume resistivity of $10^{13}$ Ω.cm or more in 20° C. air at a relative humidity of 90%; and a transparent insulator layer having a volume resistivity of $10^{13}$ Ω.cm or more in 20° C. air at a relative humidity of 90%; wherein all of the layers are successively layered in the order presented;

(B) display means for displaying recording images onto the board surface of the liquid crystal board, and erasing means for erasing the recorded images; and (C) a power source for generating a surface potential between the surface of the liquid crystal board and the conductive layer by the display means;

wherein the display means employs a writing member electrically connected to one terminal of the power source which is connected at the other terminal thereof to said conductive layer; and the erasing means employs an erasing member electrically connected to said conductive layer.

(5) The hand-writable liquid crystal board set according to item 4, wherein said high-electric resistance layer comprises a polymer having a cross-linked structure or a polymer film.

(6) The hand-writable liquid crystal board set according to item 4, wherein the polymer matrix of said liquid crystal-dispersed polymer layer is composed of a polymer having a cross-linked structure.

(7) The hand-writable liquid crystal board set according to item 4, wherein a lead wire which electrically connects said power source with said writing member, said writing member itself, a lead wire which electrically connects said conductive layer with said erasing member, and said erasing member itself all have a respective volume resistivity of $10^{12}$ Ω.cm or less in 23° C. air at a relative humidity of 50%.

(8) The hand-writable liquid crystal board set according to item 4, wherein an electric resistance of 200KΩ to 100MΩ is electrically connected at least between one terminal of said power source and said conductive layer, between one terminal of said power source and said erasing member and between said conductive layer and said erasing member.

(9) The hand-writable liquid crystal board set according to item 4, wherein an electric circuit including said display means and said erasing means is equipped with an interlock device for preventing the occurrence of electric shocks.

(10) The hand-writable liquid crystal board set according to item 4, wherein an electric circuit including said display means and said erasing means is equipped with an automatic power-off device.

(11) The hand-writable liquid crystal board set according to item 4, wherein the board surface of said board, or said writing member and said erasing member have been subjected to a dirt-protection treatment.

(12) The hand-writable liquid crystal board set according to item 11, wherein said dirt-protection treatment on said board surface has a hard coating having abrasion-resistance.

(13) The hand-writable liquid crystal board set according to item 12, wherein said hard coating comprises at least one resin selected from the group consisting of thermosetting silicone resin, thermosetting fluororesin and acrylic resin.

(14) The hand-writable liquid crystal board set according to item 4, wherein said writing member and/or said erasing member comprises a film-like or sheet-like substrate having a pattern of a conductive material formed thereon.

Figure 1:
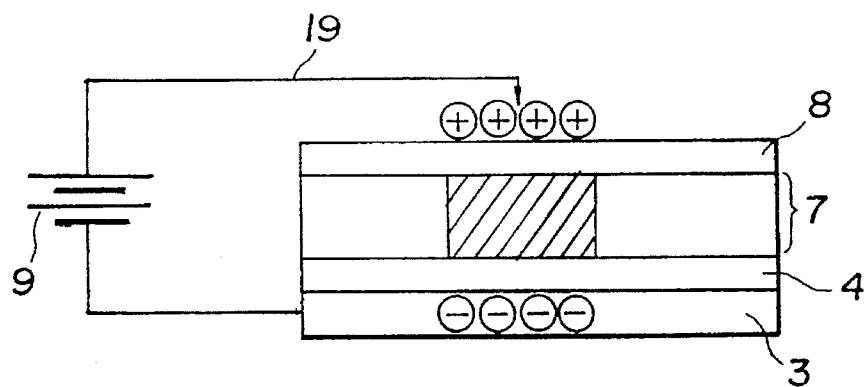
FIG. 1 is a conceptional view showing a writing/drawing state of a liquid crystal display device (liquid crystal board) of the externally charging type according to the present invention.

1. liquid crystal display device (liquid crystal board) of externally charging type
2. substrate
3. conductive layer
4. transparent high-electric resistance layer
5. polymer matrix
6. liquid crystal droplet
7. liquid crystal-dispersed polymer layer
8. transparent insulator layer
9. electric power source (built-in automatic power-off device)
10. terminal
11. electric resistance
12. lead wire
13. electric resistance
14. terminal
15. lead wire
16. a-contact of a switch for writing
17. lead wire
18. b-contact of a switch for erasing
19. lead wire
20. writing member (pen type)
20'. writing member (stamp type)
21. lead wire
22. b-contact of a switch for writing
23. lead wire
24. a-contact of a switch for erasing
25. electric resistance
26. lead wire
27. erasing member
28. switch for writing
29. board screen
30. recorded image
31. switch for erasing
32. contact type surface electrode of a switch for writing
33. contact type surface electrode of a switch for erasing

DESCRIPTION OF THE PREFERRED EMBODIMENTS

The liquid crystal display device of externally charging type, or liquid crystal board for use in a hand-writable liquid crystal board set of the present invention is composed mainly by successively forming in layered structure a conductive layer, a transparent high-electric resistance layer having a volume resistivity of $10^{13}$ $\Omega$.cm or more in 20° C. air at a relative humidity of 90%, a liquid crystal-dispersed polymer layer in which liquid crystal droplets are dispersed in a polymer matrix and which has a volume resistivity of $10^{13}$ $\Omega$.cm or more in 20° C. air at a relative humidity of 90%, and a transparent insulator layer.

The conductive layer of the liquid crystal board may be either transparent or opaque as long as the surface resistance thereof is not more than $10^7$ $\Omega/\square$. In practice, a glass or a plastic film such as polyester, polyimide, etc. is used as a substrate, and the surface of the substrate is coated for conduction with aluminum, titanium, chromium, tin, rhodium, gold, stainless steel, titanium nitride, nickel-chromium alloy, aluminum-chromium alloy or indium tin oxide.

The liquid crystal-dispersed polymer layer as a component of the liquid crystal display device of the externally charging type of the invention includes finely dispersed liquid crystal in a polymer matrix. As a preferable feature of the layer, droplets of liquid crystal are finely and individually dispersed in the polymer matrix, in order to improve the volume resistivity of the liquid crystal-dispersed polymer layer.

The ratio of polymer/liquid crystal in the liquid crystal-dispersed polymer layer falls within a range of 9/1 to 1/9, and is preferably from 7/3 to 5/5. Since finely dispersed liquid crystal drops having extremely large or much smaller size reduces the background white-cloudiness which makes recorded images clear, their size preferably ranges from about 0.1 to 20 micrometers. The thus obtained liquid crystal-dispersed polymer layer preferably has a thickness of 1 to 50 micrometers.

The volume resistivity of the liquid crystal-dispersed polymer layer is preferably $10^{13}$ $\Omega$.cm or more in 20° C. air at a relative humidity of 90%. If the resistivity is less than $10^{13}$ $\Omega$.cm, the static charges for forming recorded images cannot be retained balanced between the upper and lower interfaces of the liquid crystal-dispersed polymer layer, and are easy to move, thus the contours of the recorded images lose sharpness with the passage of time.

As a polymer used for the liquid crystal-dispersed polymer layer, there can be mentioned vinyl resin such as polyvinyl acetal, acrylic resin and the like; polyester, polysulfone, polyphenylene oxide, ionomer, polycarbonate, polyolefin and the like.

Examples include silicone polymer and polymers containing at least one functional group selected from the group consisting of a double bond, nitrile, mercapto, hydroxyl, carboxyl, epoxy, chloro, fluoro, isocyanate, methoxy, amino, or chlorosulfone.

More specifically, there can be mentioned vinyl resins such as polyvinyl acetal, acrylic resins and the like, epoxy resin, polyester, polyamide, vinylidene chloride resin, silicone resin, chlorinated polyethylene, chlorosulfonated polyethylene, polyphenylene oxide, styrene-butadiene rubber, ionomer, fluororesin, etc.

Examples of the polyvinyl acetal resin include polyvinylformal, polyvinyl acetal, polyvinyl butyral etc.

Polymers having a cross-linked structure (which will be referred to as cross-linked polymers hereinafter) are preferably used.

Cross-linked polymers can be obtained by mixing a polymer having one of the aforementioned functional groups with a cross-linking agent reactive with the functional group to cause a reaction between them, or by mixing a polymer having one of the aforementioned functional groups with a reactive polymer to cause a reaction between them. Cross-linked polymers do not interact with liquid crystals at an elevated temperature, so that finely dispersed liquid crystal structure can be maintained in a stable form. As a result, the liquid crystal-dispersed polymer layer becomes durable and no deterioration of performances occurs after the passage of time.

Examples of the cross-linking agents used for the above-mentioned reaction, include organic peroxides, amine compounds, aziridine compounds, epoxy compounds, dicarboxylic acids or anhydrides of carboxylic acids, formaldehyde, dialdehydes, diols, bis-phenol, silanol compounds, metallic oxides, metallic halides, photo-cross-linking agents (photopolymerization initiator), etc. Examples of the reactive polymers include phenol resins, amino resins, polyisocyanates, polyols, epoxy resins, etc.

As preferable cross-linked polymers, there can be mentioned cross-linked polymers formulated from a reaction between a di- or polyisocyanate and a polymer such as polyvinylacetal resin, an epoxy resin, an acrylic resin having a functional group such as a hydroxyl group, carboxyl group, etc., polyester resin, fluororesin, and the like. A more preferable cross-linked polymer is formulated from a reaction between di- or polyisocyanate and polyvinylacetal resin.

Examples of the polyvinyl acetal resins include polyvinylformal, polyvinyl acetal, polyvinyl butyral etc.

A liquid crystal used in the invention comprises a nematic liquid crystal having positive dielectric anisotropy. The liquid crystal is required to have a mesomorphic temperature range of $-10$ to $100°$ C. to match with the practical utility as a liquid crystal board, and preferably has indices of birefringence $\Delta n$ of 0.2 or more, in order to improve the cloudiness of the liquid crystal which serves to make the recorded image sharp. The liquid crystal may be added with a dichroic dye as required.

Dispersion of the liquid crystal in the polymer matrices can be carried out by the polymer-liquid crystal common solvent evaporating separation process (common solvent casting process), the polymerizing phase-separation process in which precursor mixture of liquid crystal and polymer is polymerized by light or heat, the melt cooling phase-separation process in which liquid crystal and polymer are heated to melt and then cooled, or by making the liquid crystal micro-capsulized and dispersing the liquid crystal microcapsules in the polymer.

A transparent polymer having high electric resistance can be used as the transparent insulator layer for the liquid crystal board of the invention. The volume resistivity of the layer is preferably $10^{13}$ $\Omega$.cm or more at a relative humidity of 90% in $20°$ C. air. The transparent insulator layer is prepared such that a film made of, for example, polyethylene phthalate, polyethylene naphthalate, polypropylene, polyethylene, polyvinylchloride, polysulfone, polyphenylene oxide, ionomer, polycarbonate, nylon or fluororesin, is layered with a bond or adhesive or such that a solution of a material having the aforementioned physical properties is applied and dried. Use of a material having a volume resistivity of less than $10^{13}$ $\Omega$.cm at a relative humidity of 90% in $20°$ C. air for the transparent insulator layer gives rise to a problem in its performance for the same reasons as stated for the liquid crystal-dispersed polymer layer, and therefore the thus obtained liquid crystal board will not have practical utility. A more preferable transparent polymer used in the transparent insulator layer is a polyethylene terephthalate film.

A transparent high-electric resistance layer of the liquid crystal board of the invention is disposed between the conductive layer and the liquid crystal-dispersed polymer layer. The volume resistivity is $10^{13}$ $\Omega$.cm or more at a relative humidity of 90% in $20°$ C. air. This layer prevents the static charges retained on the upper and lower interfaces of the liquid crystal-dispersed polymer layer from moving and attenuating, thereby improving the sharpness of contours of the recorded image, memory retention, erasability, etc. Use of a material having a volume resistivity of $10^{13}$ $\Omega$.cm or less at a relative humidity of 90% in $20°$ C. air for the transparent high-electric resistance layer gives rise to a problem in its performance for the same reasons as stated for the liquid crystal-dispersed polymer layer, and therefore the thus obtained liquid crystal board will not have practical utility.

The thickness of the transparent high-electric resistance layer ranges from 0.1 μm to 50 μm, preferably 0.5 μm to 30 μm. In the case where the thickness of the transparent high-electric resistance layer is less than 0.1 μm, it is not possible to consistently prevent the above-mentioned transfer and decay of electrostatic charge and improve the sharpness of the contours of a recorded image, memory retention, erasability and the like.

When the thickness is more than 50 μm, voltage applied on the board is polarized and applied depending on the thickness of each layer. As a result, the voltage applied substantially on the above-mentioned liquid crystal-dispersed polymer layer decreases and therefore, it is necessary to apply a higher voltage on the board to orient liquid crystal molecules in the liquid crystal-dispersed polymer layer. Thus, there is danger that an electric shock will occur during use, and the circuit and apparatus become complicated and difficult to manufacture.

The following cross-linked polymers may be used for the transparent high-electric resistance layer.

Cross-linked polymers can be obtained such that one of a silicone polymer and polymer having at least one functional group selected from the group consisting of a double bond, nitrile, mercapto, hydroxyl, carboxyl, epoxy, chloro, fluoro, isocyanate, methoxy, amino and chlorosulfone is mixed with a cross-linking agent reactive with the functional group to cause a reaction between them, or such that one of the polymers having the aforementioned functional group a mixed with a reactive polymer to form a cross-linked polymer.

Examples of the cross-linking agents used for the aforementioned reaction, include organic peroxides, amine compounds, aziridine compounds, epoxy compounds, dicarboxylic acids or anhydrides of carboxylic acids, formaldehyde, dialdehydes, diols, bis-phenol, silanol compounds, metallic oxides, metallic halides, photo-cross-linking agents (photopolymerization initiator), etc. Examples of the reactive polymers include phenol resins, amino resins, polyisocyanates, polyols, epoxy resins, etc.

As preferable cross-linked polymers, there can be mentioned cross-linked polymers formulated from a reaction between a di- or polyisocyanate, and a polymer such as polyvinylacetal resin, an epoxy resin, an acrylic resin having a functional group such as a hydroxyl group, carboxyl group, etc., polyester resin, fluororesin, and the like. A more preferable cross-linked polymer is formulated from a reaction between a di- or polyisocyanate.

Examples of the polyvinyl acetal resin utilized in the present invention includes polyvinylformal, polyvinyl acetal, polyvinylbutyral etc.

The transparent high-electric resistance layer can employ a polymer film. The polymer film can be prepared from polyethylene terephthalate, polyethylene naphthalate, polypropylene, polyethylene, polyvinyl-chloride, polysulfone, polyphenyleneoxide, ionomer, polycarbonate, nylon, fluororesin, silicon dioxide, etc.

The liquid crystal-dispersed polymer layer, transparent insulator layer and transparent high-electric resistance layer are provided in layer form by an application process in which a solution of the polymer is applied and dried, or by a laminating process in which a film of the polymer is adhered with a bond or adhesive.

The bond or adhesive is preferably a cross-linking polymer. Examples of the cross-linking polymers used for the bond or adhesive, include phenol resin, epoxy resin, nylon-epoxy resin, epoxy-polyamine, polyamide resin, polyimide resin, synthetic rubber, cellulose resin etc. A hot-melt bond or adhesive may be used as the bond or adhesive. Examples of the polymers used for the hot-melt adhesive include ethylene-vinylacetate copolymer, ethylene-ethylacrylate copolymer ethylene-acrylate copolymer, polyamide, polyester, styrene-butadiene copolymer etc.

In the liquid crystal board of the present invention, in order to obtain an image having clear contrast, a dichroic dye may be added to the liquid crystal of the liquid crystal-dispersed polymer layer to change the color tone of the board screen. Alternatively, if, with transparent conductive layer and substrate, paper, plastic film or other material is disposed as a coloring layer on the outer side of the substrate, any color can be allotted to the board screen and the image, thus making it possible to form a clear contrast image.

The display means for recording images used in the handwritable liquid crystal board set of the invention employs a writing member electrically connected to one terminal of a power source which is connected at the other terminal thereof to the conductive layer of the liquid crystal board for generating a surface potential between the surface of the liquid crystal board and the conductive layer. When the writing member is brought into contact with the board screen of the liquid crystal board, it is possible to form a recording image.

If the surface potential is generated on the board screen, the liquid crystal present in the liquid crystal-dispersed polymer layer is aligned by the static electric field, so that the aligned portions become transparent in a white-clouded board screen, thus forming an image with high contrast. When the surface potential is less than a threshold level above which the liquid crystal in the liquid crystal-dispersed polymer is to be aligned, the liquid crystal cannot be aligned enough to be made completely transparent. When this occurs, the recorded image has poor contrast.

Erasing means for erasing recorded images in the hand-writable liquid crystal board set of the present invention, includes an erasing member electrically connected to the conductive layer of the liquid crystal board. When the erasing member is brought into contact with a recorded image on the board screen (or more exactly on the surface of the transparent insulator layer) of the liquid crystal board, the recorded image and the conductive layer become equipotential, whereby the static charges present in the recorded image area are easily removed resulting in the erasure of the recorded image.

In the hand-writable liquid crystal board set of the present invention, the display means extending from the terminal of the power source to the writing member as well as the erasing member from the conductive layer to the erasing member may be composed of a conductive material having a resistivity of $10^{12}$ $\Omega$.cm or less at a relative humidity of 50% in 23° C. air, and preferably of a conductive material having a resistivity of $10^8$ $\Omega$.cm or less. When drawing or erasing operation is effected with the display or erasing means made of a conductor of $10^{12}$ $\Omega$.cm or less, it is possible to smoothly provide static charges onto the board screen to align the liquid crystal, or to easily remove the static charges and restore the initial state of the liquid crystal from the aligned state. As a result, an image with high contrast, and a smooth erasing performance can be easily achieved.

On the other hand, if the volume resistivity of the conductor is more than $10^{12}$ $\Omega$.cm, the contrast of the recorded image becomes low, the response becomes dull, and the erasability becomes insufficient so that desired erasability cannot be obtained unless erasing operations are performed repeatedly.

Primarily in the present invention, transparent images are to be formed on, for instance, a white-clouded background of the board screen. An image of white-cloudiness, opposing the original display, however can also be obtained in the transparent board screen. This can be effected by, at first, providing static charges onto the board screen entirely by means of the writing member to align the liquid crystal and next, removing part of the static charges from the board screen by means of the erasing member.

In the hand-writable liquid crystal board set of the present invention, the writing member used for the display means and the erasing member used for the erasing means are to be connected electrically to the terminal of the power source and the conductive layer, respectively. Here, the "electrical connection" must not be assumed as a connection by the lead wire. For example, the human body is electrically conductive, so that it is possible to use part of human body for drawing and erasing. That is, while contacting an appropriate part of the display means with one hand, an operator can touch the board screen through the writing member held by the other hand to thereby make an image in the same manner as with the above display means. In a similar manner, while contacting an appropriate part of the erasing means with one hand, the operator can touch the board screen through the erasing member held by the other hand to thereby erase the recorded image in the same manner as with the above erasing means. In this case, it is also possible to draw or erase an image directly with hands or fingers without any writing or erasing member.

In the hand-writable liquid crystal board set of the present invention, the writing member and erasing member can be composed of a metal or an alloy of copper, iron, aluminum, tin, palladium, gold, silver, brass, stainless steel, etc. It is also possible to use metallic oxides such as of tin, indium, silver, zinc, manganese, etc.; conductive polymers such as polypyrrole, polythiophene, polyaniline, etc; and conductive materials such as graphite, carbon fiber, etc.

These materials can be used in various forms depending upon the characteristic of the material. That is, some of these materials may be directly formed into a wire (lead wire), a contact (terminal) or a conductive fabric. Alternatively, coating the surface of a plastic film, fabric, nonwoven fabric, rubber, sponge, glass, etc. with one of the materials above allows a conductive film, conductive fiber, conductive rubber, conductive sponge, conductive glass, etc. Alternatively, some of the materials are processed into grains or fibers, and thus formed grains or fibers can be kneaded with a plastic or a rubber to form a conductive plastic, conductive rubber, conductive porous member, etc. These products can be used in combination in accordance with the object, or may be further processed so as to be used as a writing member or an erasing member.

By preparing a writing member and/or erasing member in a form of a stamp using a conductive elastic material, it is possible to easily display any letter or any pattern by contacting the stamp onto the board screen. Alternatively, using a film-like or sheet-like substrate having a conductive pattern formed thereon by a transparent or opaque conductive ink or conductive resin, it is possible to easily display a complicated shape or pattern such as maps and the like on the board screen at one time. Moreover, preparing conductive fibers or an elastic conductive body of a calligraphic brush type and using it makes it possible to make the trace of the recorded image vary narrower or wider as if it were written with a calligraphic brush.

The power source in the board set of the present invention is preferably composed of a substantially direct current power source which provides a potential difference between the conductive layer and the writing member so as to generate a surface potential on the board screen. The potential difference is dependent on the thickness of each layer, but is preferably 2000 volts or less. The potential difference is preferably 200–800 volts when the thickness of the transparent high-electric resistance layer is within a range of 2–25 μm, the thickness of the liquid crystal-dispersed polymer layer is within a range of 5–9 μm and the thickness of the transparent insulator layer is within a range of 6–12 μm. For example, the potential difference is preferably 250–750 volts, or more preferably 400–600 volts when the thickness of the transparent high-electric resistance layer is 3 μm, the thickness of the liquid crystal-dispersed polymer layer is 7 μm and the thickness of the transparent insulator layer is 9 μm. Further, the potential difference is preferably 480–980 volts, or more preferably 630–830 volts when the thickness of the transparent high-electric resistance layer is 82 μm, the thickness of the liquid crystal dispersed polymer layer is 7 μm and the thickness of the transparent insulator layer is 6 μm.

The reasons for the afore-mentioned are that if the potential difference is less, a recorded image cannot be obtained because the liquid crystal molecule in the liquid crystal-dispersed polymer layer cannot be oriented in the direction of the electric field, and if the potential difference is more, the erasability of the recorded image will be unsatisfactory because the static charges in the recorded image portion become difficult to remove. Any power source, for example, even a solar battery may be used as long as it satisfies the above requirement.

In the hand-writable liquid crystal board set of the invention, there is a possibility or fear of receiving an electric shock if an operator comes in contact with a part of the erasing means while touching a part of the display means for generating the surface potential on the board screen of the liquid crystal board. So this respect is to be considered. To deal with this problem, a safety mechanism (or interlock) was developed and is provided to the hand-writable liquid crystal board set in order to prevent the electric shock from occurring even when the body of the operator comes into contact with both the parts of the display means and the erasing means simultaneously. The interlock mechanism used in this hand-writable liquid crystal board set, utilizes a configuration in which the power source provides a surface potential onto the board screen through the display means which is connected at one terminal thereof and the other terminal of the power source is connected to the conductive layer whereas the erasing means for erasing the recorded image on the board screen is connected to that terminal of the power source which is connected to the conductive layer. In such a structure, the interlock operates as a safety device which functions electrically or mechanically such that at least one of the terminals of the display and erasing means is adapted to disconnect when an operator's body comes in contact with both the display means and the erasing means simultaneously.

In addition to the interlocking arrangement, electric resistors of 200Ω to 100MΩ are each provided between the conductive layer-sided terminal of the power source and the conductive layer, between the erasing member-sided terminal of the power source and the erasing member, and between the conductive layer and the erasing member. These resistors afford improved safety to the hand-writable liquid crystal board set, whereby no electric shock can be felt if the displaying means and/or the erasing means are brought into contact with the operator's body. The resistance used here may be within a range of from 200KΩ to 100MΩ for a generated voltage of 50 to 1000 volts, and more preferably is limited within a range of from 1M Ω to 40M Ω. The reason for limiting the resistance as such is because that, if any member of the display and the erasing means is brought into contact with the human body through a resistance less than 200K Ω when a 1000 V power source is used, 5 mA or more current flows through the human body to give an electric shock thereto. On the other hand, if a resistance over 100MΩ is employed, a current leak may easily occur due to the relation to the other insulating resistances in the substrate etc., resulting in a voltage drop in the generated voltage, or deterioration of the response for the display and erasing operations occurs resulting in inability to perform smooth display and erasing operations. Since the hand-writable liquid crystal board set is provided with both the interlock arrangement and the electric shock protecting measure based on the resistances, the board set is highly improved in safety and can be used by anyone without fear or anxiety.

The hand-writable liquid crystal board set thus highly improved in safety can be utilized in a cordless type set. In the hand-writable liquid crystal board set of the cordless type, a power source is connected at one terminal thereof to a conductive layer while the other terminal of the power source is connected through a resistance to a surface electrode which works as press-button of a switch for writing. The conductive layer is also connected through a resistance to another surface electrode which works as a press-button of a switch for erasing. Here, the switches for writing and erasing constitute interlocking structures. Connected to one of the terminals of the power source is a series of a b-contact of the switch for writing and an a-contact of the switch for erasing, whereas a series of an a-contact of the switch for writing and a b-contact of the switch for erasing is connected to the other terminal of the power source. With this arrangement, touching the surface electrode of the switch for writing with the left hand to press it, an operator can draw a recording image by touching the board surface with the right hand itself or the writing member held in the right hand. On the other hand, touching the surface electrode of the switch for erasing with the left hand to press it, the operator can erase a recorded image by touching the board surface with the right hand itself or the erasing member held in the right hand. In both cases, no lead wire is required, therefore even though display and erasing are repeated in many times, there is no fear that the wires are entangled or disconnected, thus allowing the handwritable liquid crystal board set to be simple and durable.

In the hand-writable liquid crystal board set of the invention, there may be provided an automatic power-off device to the electric circuit for the display means. Since this device will automatically cut the switch of the power source after the passage of a predetermined time if the switch has been left on-state, it is possible to make the apparatus power-saving type which does not waste electric power.

In the hand-writable liquid crystal board set of the invention, the board screen and the writing and erasing members can be impregnated or coated with an oil. Alternatively, a polymer film may be coated on these items. With these treatment, the board screen will be resistant to dirt. The oil to be used should have a volume resistivity of $10^{13}$ Ω.cm or more at 50% RH in 23° C. air, a boiling point of 200° C. or more, insolubility in water and a low surface tension. Examples of the oil include insulation oil, silicone oil, fluorine oil, etc. As the polymer, fluororesin is an example. Repetitions of display and erasing operations on the board screen can cause oil, sweat, cosmetic or any other dirt from the hands to collect on the board screen little by little over a long period of time. This can cause the applied static charges to be easily moved and therefore attenuated, resulting in deterioration of the contour sharpness of the recorded image and lowering the memory retention and the erasability. The above treatment eliminates or prevents these adverse effects.

By forming a hard coating having abrasion-resistance on a board display, the board display becomes difficult to damage and stain. Also, it is easy to clean the board display. As an applicable hard coating, a volume resistivity thereof is $10^{13}$ Ω.cm or more at 50% RH in 23° C. air and a polymer coating having abrasion-resistance may be used. Suitable polymers include thermosetting silicone resin, thermosetting fluoro resin, photo-curing acrylic resin and the like. "Having abrasion-resistance" mentioned herein means that the coating hardness is 2H or more of the pencil hardness as evaluated in accordance with the Pencil Scratch Test described in JIS K 5400-90. In general, by writing and erasing repeatedly on a board display, the board display becomes damaged gradually and contaminants stick to the damaged portion little by little. Consequently, transfer and decay of applied electrostatic charges are likely to occur and the sharpness' of contours of a recorded image, memory retention and erasability deteriorate. However, these problems can be solved by using the above-mentioned means. A more preferable polymer used in a hard coating is photo-curing acrylic resin.

Figure 3:
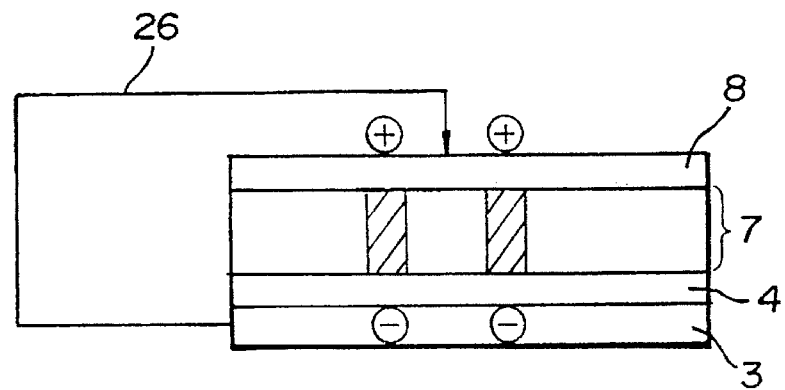
FIG. 3 is a conceptional view showing an image erasing state of a liquid crystal display device (liquid crystal board) of the externally charging type according to the present invention.

In the hand-writable liquid crystal board set of the invention, display and erasing of the recording image are carried out based on a principle that the presence and absence of static electric fields in the liquid crystal-dispersed polymer layer of the liquid crystal board create transparent and opaque states on the liquid crystal display device of the externally charging type. More specifically, liquid crystal droplets in the liquid crystal-dispersed polymer layer are finely dispersed in the polymer matrix and molecules of the liquid crystal are aligned along the polymer wall. Accordingly, when the static charge is not supplied, the difference in index of refraction between the polymer and the liquid crystal causes light-scattering and make the liquid crystal board white-clouded or opaque. On the other hand, if an electric field is applied to the liquid crystal-dispersed polymer layer through the transparent insulator layer by the display means, the liquid crystal is oriented in the direction of the electric field. By this alignment, the indices of refraction in the polymer and the liquid crystal become substantially equal to each other. As a result, light scattering is inhibited to create transparent areas, or a contrast is generated between the board screen and the recorded image so as to put the screen in the displaying state (FIG. 1). In order to erase the image, the electric field created in the liquid crystal-dispersed polymer layer is to be removed by the erasing means. By the operation, the liquid crystal is brought back to the initial state or the state in which no electric charge is present, and light is scattered again to bring the board screen to the white-clouded state (FIG.3).

In accordance with the hand-writable liquid crystal board set of the present invention having the above-described structure, it is possible for anyone to easily write and draw images and erase the recorded images by hand using the simple display and erasing means, without necessity of a complicated apparatus and troublesome operations. In addition, despite the fact that electric operations, namely provision and removal of electric charges are carried out in displaying and erasing, the board set exhibits excellent safety without fear of electric shock to the human body.

Figure 2:
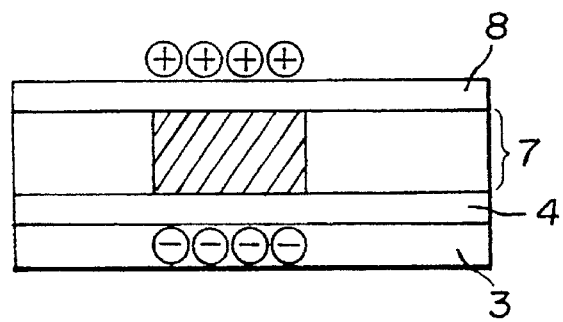
FIG. 2 is a conceptional view showing an imagerecorded state of a liquid crystal display device (liquid crystal board) of the externally charging type according to the present invention.

In accordance with the prior art, a liquid crystal display device is formed such that a liquid crystal-dispersed polymer layer is laminated directly onto a conductive layer. In such a liquid crystal display device, provision of static charges is conducted by various methods, such as for example, voltage application, corona discharge, contact electrical charging, etc., thus generating electric fields in the portions in which electric charges is provided. Although the electric fields thus generated make the liquid crystal align to form an image, the static charges move and therefore attenuate with the passage of time. In other words, the electric fields attenuate and disappear with time, so that the alignment of the nematic liquid crystal is brought back to the initial state, resulting in insufficiency of the memory performance as a display device. In this invention, however, a high-electric resistance layer is disposed between the conductive layer and the liquid crystal-dispersed polymer layer, so that memory retention is markedly improved. The high-electric resistance layer prevents the static charge from moving, the electric field for the recorded image being retained (FIG. 2), thus providing an excellent performance for memory retention of the recorded image which could not be achieved by the conventional structure.

In the liquid crystal display device of the invention, the static charges in the recorded image portion can be removed easily by electrically connecting the conductive layer with the image recorded portion or the surface of the transparent insulator layer so that the two portions may be equi-potential. As a result, the electric field disappears, bringing the alignment of the liquid crystal back to the initial state. In other words, erasing of the recorded image can be conducted in a simple manner (FIG. 3). In the conventional liquid crystal display device, the static charges remaining in the liquid crystal-dispersed polymer layer on the side of the conductive layer move and attenuate with the passage of time, so that the balance of the static charge between the upper and lower sides of the liquid crystal-dispersed polymer layer is lost. This imbalance of the charges makes it difficult to remove or eliminate the electric field from the surface of the transparent insulator layer, resulting in a poor erasability. In the present invention, however, the provision of the transparent high-electric resistance layer also improves the erasability. The high-electric resistance layer inhibits the static charge from moving, and the balance of the static charge amount between the upper and lower sides of the liquid crystal-dispersed polymer layer is retained, thus providing excellent erasability of the recorded image which could not be achieved by a conventional structure.

Generally, the transparent insulator layer is provided for the purpose of protecting the liquid crystal-dispersed polymer layer. The provision is to prevent the liquid crystal-dispersed polymer layer, which works as a display screen, from being easily damaged due to the friction and abrasion by the other members when recording and erasing are effected. But the provision of the transparent insulator layer also prevents the attenuation of the static charge from the liquid crystal-dispersed polymer layer even at the time of high humidity, specifically at a relative humidity of 90% in 20° C. air. This makes the recorded image clear without blurring at its contour with the passage of time, and improves the memory retention performance and the erasability of the recorded image. This can be considered that the transparent insulator layer keeps the balance of the static charge between the upper and lower sides of the liquid crystal-dispersed polymer layer.

According to the present invention, in the hand-writable liquid crystal board set a large-sized board screen can be provided and display and erasing of the image can be effected from the outside of the board screen due to the characteristic of the liquid crystal board of externally charging type used. In addition, memory retention performance of the recorded image is excellent and the liquid crystal board has a sufficient durability for practical use. Moreover, the hand-writable liquid crystal board set is designed to protect against electric shocks etc., so even a child can operate the board set safely. Therefore, the apparatus of the present invention can lend itself to wide usage, not only for business use, but also for toy or game uses, and for educational usage as well.

EXAMPLES

Example 1

Figure 4:
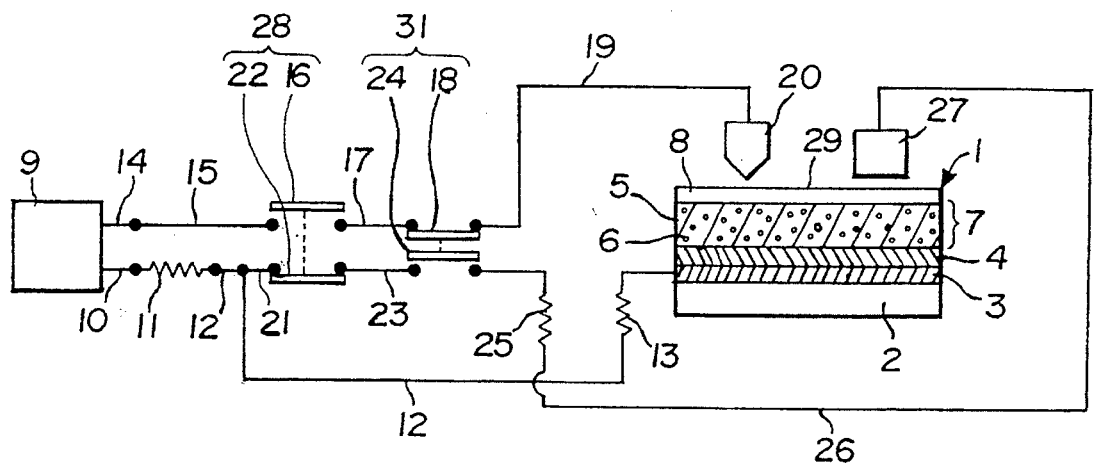
FIG. 4 is a conceptional view showing a hand-writable liquid crystal board set with cord of the present invention.
Figure 6:
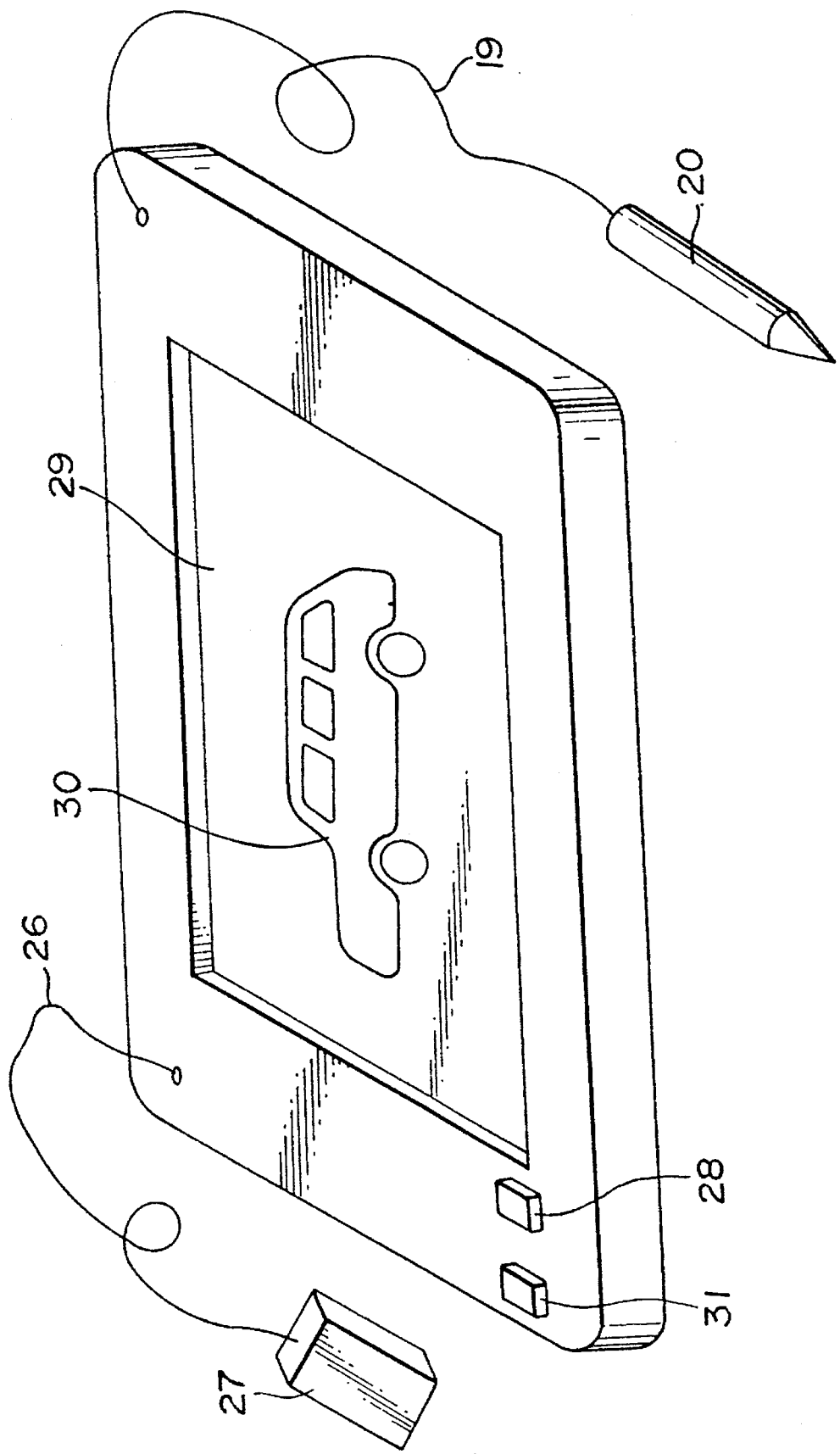
FIG. 6 is a practical perspective view showing the hand-writable liquid crystal board set shown in FIG. 4.

The description will be made with reference to FIGS. 4 and 6.

(a) Preparation of a liquid crystal display device of the externally charging type:

A deposition aluminum layer of an aluminum deposited film ("#125 Metallumy TS" manufactured by Toyo Metallizing Co.,Ltd) having a substrate 2 made of polyethylene terephthalate film was used as a conductive layer 3, on which a solution having the following composition was applied, dried and cured as a high-electric resistance transparent layer 4 with a dry film thickness of 3 μm.

| | |
|---|---|
| Polyvinylformal ("DENKAFORMAL #20" made by DENKI KAGAKU KOGYO KABUSHIKI KAISHA) 10% in tetrahydrofuran solution | 9.0 g |
| Polyisocyanate ("TAKENATE D110N" made by Takeda Chemical Industries, Ltd.) | 0.4 g |

A solution having the following composition was applied, dried and cured with a dry film thickness of 7 μm so as to form a liquid crystal-dispersed polymer layer 7 in which liquid crystal droplets are finely dispersed in polymer matrix.

| | |
|---|---|
| Polyvinylformal ("VINYLEC K-624" made by CHISSO CORPORATION) 10% in tetrahydrofuran solution | 4.2 g |
| Polyisocyanate ("TAKENATE D110N" made by Takeda Chemical Industries, Ltd.) | 0.56 g |
| Nematic liquid crystal ("E44" made by MERCK Co.,) | 0.36 g |

Laminated on the above liquid crystal-dispersed polymer layer was a transparent insulator layer 8 with 9 μm in thickness of polyethylene terephthalate film ("TETRON film F" made by TEIJIN LIMITED) using a one-part cross-linking type acrylic adhesive ("SK DYNE 100" made by Soken Chemical & Engineering Co., Ltd.) to complete a liquid crystal display device of the externally charging type 1.

The transparent high-electric resistance layer 4 and the liquid crystal-dispersed polymer layer 7 which had been adjusted in 20° C. air at 90% RH were measured on the volume resistivity using a D.C. power supply ("PR-630" made by TORIO Co.,), an electrometer ("TR8651" made by Takeda Riken Co., Ltd), an insulating resistance measuring specimen chamber ("TR42" made by ADVANTEST CORPORATION). The result is shown below.

| | | |
|---|---|---|
| Transparent high-electric resistance layer | $1.5 \times 10^{14}$ | $\Omega \cdot cm$ |
| Liquid crystal-dispersed polymer layer | $7.4 \times 10^{14}$ | $\Omega \cdot cm$ |

(b) Preparation of a hand-writable liquid crystal board set:

A hand-writable liquid crystal board set of cord type was prepared as the following procedures by using the above liquid crystal display device of the externally charging type as a liquid crystal board 1.

A conductive layer 3 of a liquid crystal board 1 of externally charging type was connected to one terminal 10 of a direct current power source 9 which generates a voltage of 600 V between terminals using unillustrated 1.5 V drycell (U-3 type), through a series of a resistance 11 of 10MΩ, a lead wire 12 and another resistance 13 of 10MΩ. Another terminal 14 of the power source 9 was connected to a writing member 20 made of a conductive sponge ("MOSPAC P", a product of FUJIMORI KOGYO CO., LTD.) having a volume resistivity of $5 \times 10^4$ Ω.cm at 50% RH in 23° C. air, through a series of a lead wire 15, a-contact 16 of a switch for writing, a lead wire 17, b-contact 18 of a switch for erasing and a lead wire 19. Another conductive sponge ("MOSPAC GS", a product of FUJIMORI KOGYO CO., LTD.) having a volume resistivity of $4 \times 10^3$ Ω.cm at 50% RH in 23° C. air was connected as an erasing member 27 through a series of lead wire 21, b-contact 22 of the switch for writing, a lead wire 23, a-contact 24 of the Switch for erasing, resistance 25 of 10MΩ and a lead wire 26 to the lead wire 12.

A timer circuit (not shown) with about a five-minute shut-off time is incorporated as an automatic power-off device between the U-3 type 1.5 v drycell and the power source 9.

The switch 28 for writing comprises the a-contact 16 and the b-contact 18 which link with each other to form an interlock mechanism. The switch 31 for erasing comprises the b-contact 22 and the a-contact 24 which link with each other to form an interlock mechanism. In a usual state, the b-contact 18 of the switch for erasing and the b-contact 22 of the switch for writing are in the connected state, whereas the a-contact 16 of the switch for writing and the a-contact 24 of the switch for erasing are in the disconnected state.

As described above, the hand-writable liquid crystal board set of this embodiment was prepared.

(c) Writing member and recording image

Pen type writing member:

A figure was written on a board screen 29 of the liquid crystal board 1 using the writing member 20 while the switch 28 for writing being pressed. As a result, a surface potential arose in the written portion on the board screen 29 and the thus formed static field made the liquid crystal of the liquid crystal-dispersed polymer layer 7 align, so that a recording image 30 of the figure could be displayed.

Stamp type writing member:

A stamp 20' was prepared as the writing member 20 using a conductive sponge ("MOSPAC P", a product of FUJIMORI KOGYO CO.,LTD.) having a volume resistivity of $5 \times 10^4$ Ω.cm at 50% RH in 23° C. air. Use of the stamp 20' made it possible to record and display an image of characters and figures on the board screen 29 easily at a time.

Pattern film type writing member:

As the writing member 20, a 50 μm polyethylene terephthalate film ("TETRON film H7W" manufactured by TEIJIN LIMITED) was formed into a pattern film (not shown) having characters, figures etc. written or drawn on its surface with a transparent conductive ink ("I-201", a product manufactured by Sumitomo Cement Co., Ltd.). Use of the pattern film made it possible to record and display an image of characters and patterns on the board screen 29 easily at a time.

Calligraphic brush type writing member:

As the writing member 20, the aforementioned conductive sponge ("MOSPAC P", a product of FUJIMORI KOGYO CO.,LTD.) was formed into a cone-shape to prepare a calligraphic brush type writing implement. Use of the implement made it possible to make the trace of the recording image vary narrower or wider as if it were written with a calligraphic brush.

(d) Erasing of recorded image:

In erasing, a recorded image 30 on the board screen 29 was traced with the aforementioned erasing member 27 while the switch for erasing was being pressed. As a result, the static charges for the recorded image 30 could be removed, facilitating erasure of a desired portion alone.

(e) Safety

In the board set of this embodiment, pressing the switch 28 for writing brings the a-contact 16 of the switch for writing into the connected state, which electrically connects the terminal 14 with the writing member 20. As a result, a voltage arises between the conductive layer 3 and the writing member 20, enabling the writing and/or drawing operation onto the liquid crystal board 1. At the same time, the b-contact 22 of the switch for writing and the a-contact 24 of the switch for erasing are respectively in the disconnected state, so that the erasing member 27 is electrically disconnected from the terminal 10. Therefore, no voltage can arise between the writing member 20 and the erasing member 27 while the switch 28 for writing is being pressed. Accordingly, no electric shock was felt by an operator when the operator touched the writing member 20 and the erasing member 27 with the hands at the same time while the switch 28 for writing was being pressed.

While the switch 31 for erasing was being pressed, the a-contact 24 of the switch for erasing is brought into the connected state, which electrically connects the conductive layer 3 with the erasing member 27, and thus these two portions become equipotential. As a result, the static charges in the recorded image portion can be removed by rubbing the board screen 29 with the erasing member 27, enabling the erasure of the recorded image 30. Meanwhile, the a-contact 16 of the switch for writing and the b-contact 18 of the switch for erasing are respectively in the disconnected state, so that the writing member 20 is electrically disconnected from the terminal 14. Therefore, no voltage can arise between the writing member 20 and the erasing member 27 while the switch 31 for erasing being pressed. Accordingly no electric shock was felt by an operator when the operator touched the writing member 20 and the erasing member 27 with the hands at the same time while the switch 31 for erasing was being pressed.

When both the switch 28 for writing and the switch 31 for erasing are pressed at the same time, both the b contact 18 of the switch for erasing and the b-contact 22 of the switch for writing are brought into the disconnected state. Accordingly, electrical disconnection is maintained between the terminal 14 and the writing member 20, and between the terminal 10 and the erasing member 27, respectively.

Therefore, no voltage can arise between the writing member 20 and the erasing member 27 while both the switches are being pressed simultaneously. Accordingly, no electric shock was felt by an operator when the operator touched the writing member 20 and the erasing member 27 with the hands at the same time both the switch 28 for writing and the switch 31 for erasing were being pressed.

Still, no shock was felt by an operator when both the charged board screen 29 and the erasing member 27 were touched with the hands of the operator at the same time. This is because the existence of resistances 25 and 13 between the erasing member 27 and the conductive layer 3 inhibits the current between the erasing member 27 and the board screen 29 to at most 30 μA.

Moreover, consideration was made for a case in which the conductive layer 3 of the liquid crystal board was exposed outside. In this case, no shock was felt by the operator when both the writing member 20 and the exposed portion of the conductive layer 3 were touched with the hands of the operator at the same time. This is because the existence of resistances 13 and 11 between the conductive layer 3 and the power source 9 inhibits the current between the writing member 20 and the conductive layer 3 to at most 30 μA.

(f) Power saving

In the board set of this example, an automatic power off device is provided. Therefore, if the hand-writable liquid crystal board set is left with the power switch on, the power can be automatically cut off after a predetermined period of time, thus avoiding waste of electric energy.

Thus, a hand-writable liquid crystal board set of power saving type has been completed in which display and erasing operations can be repeatedly carried out from the outside of the board screen in a simple manner, and which assures such high safety that no electric shock would harm the operator under any foreseeable circumstances.

Example 2

Figure 5:
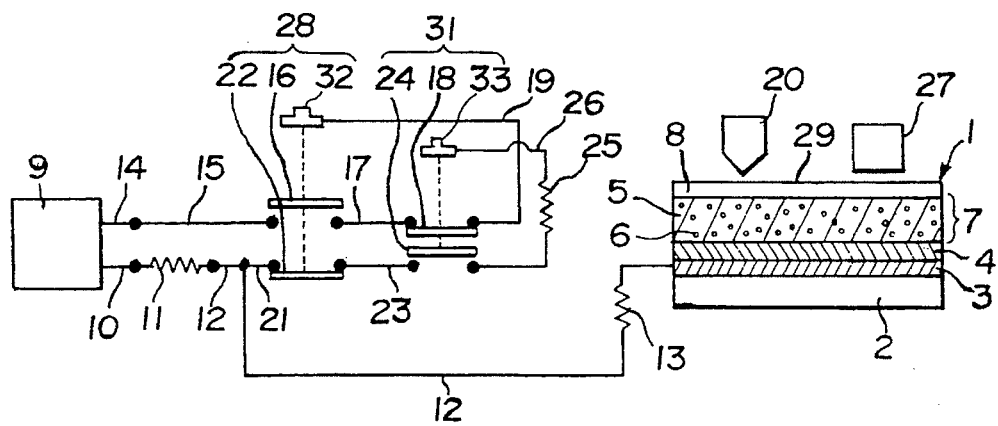
FIG. 5 is a conceptional view showing a hand-writable liquid crystal board set of a cordless type of the present invention.
Figure 7:
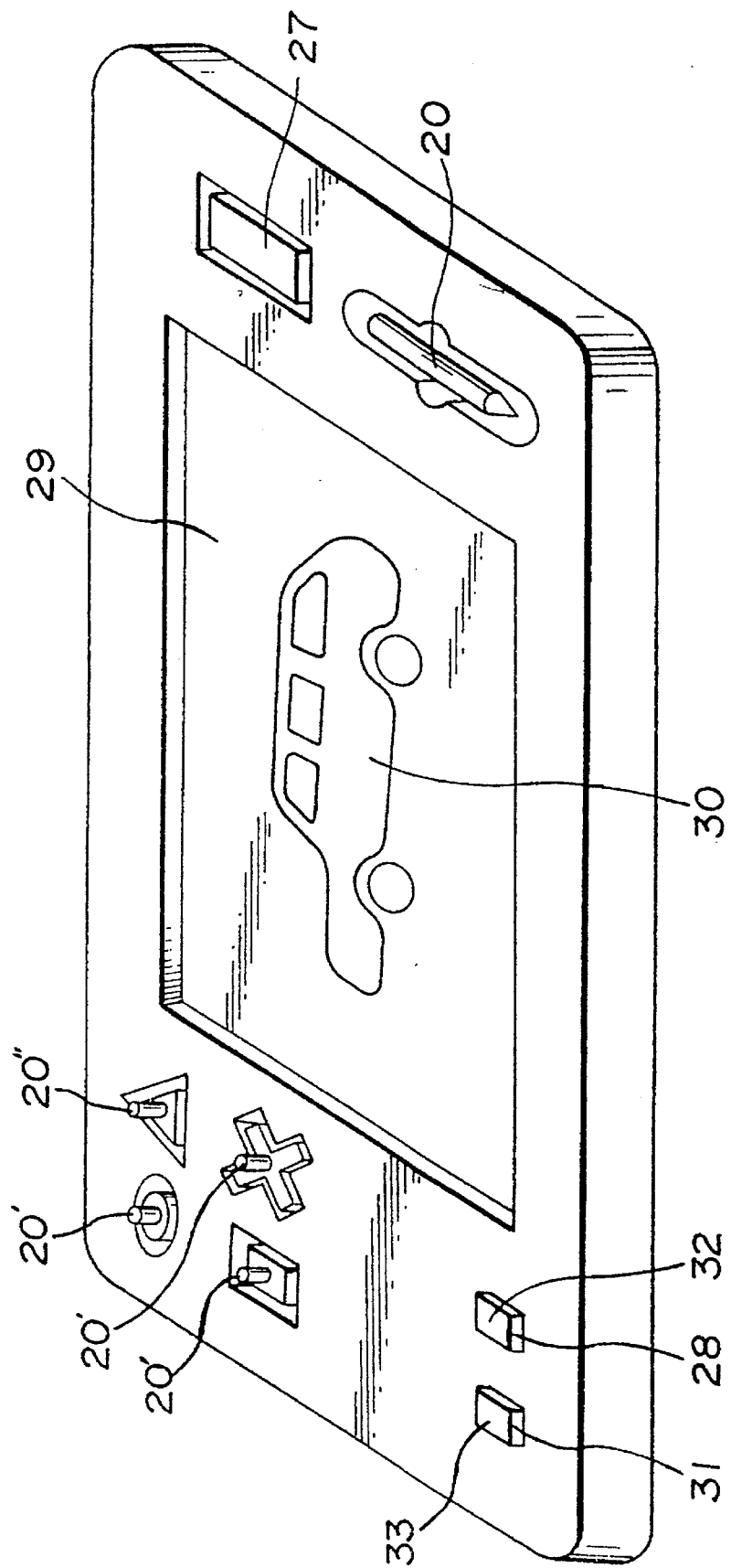
FIG. 7 is a practical perspective view showing the hand-writable liquid crystal board set shown in FIG. 5.

Description will be made with reference to FIGS. 5 and 7.

(a) Preparation of a liquid crystal display device of the externally charging type:

A liquid crystal display device of externally charging type 1 was prepared in the same manner described in example 1.

The following volume resistivities of layers were obtained in the similar measurement as in example 1.

| Transparent high-electric resistance layer | $1.5 \times 10^{14}$ | Ω·cm |
|---|---|---|
| Liquid crystal-dispersed polymer layer | $7.4 \times 10^{14}$ | Ω·cm |

(b) Preparation of a hand-writable liquid crystal board set of cordless type:

A hand-writable liquid crystal board set of cordless type was prepared as follows by using the above liquid crystal display device of externally charging type as a liquid crystal board 1.

A conductive layer 3 of a liquid crystal board 1 of the externally charging type was connected to one terminal 10 of a direct current power source 9 which generates a voltage of 600 V between terminals using an unillustrated 1.5 V type drycell, through a series of a resistance 11 of 10 MΩ, a lead wire 12 and another resistance 13 of 10 MΩ. Another terminal 14 of the power source 9 was connected with a series of a lead wire 15, a-contact 16 of a switch for writing, a lead wire 17, b-contact 18 of a switch for erasing, and a lead wire 19 to a contact type surface electrode 32 of the switch for writing. A contact type surface electrode 33 of a switch for erasing was connected through a series of a lead wire 21, b-contact 22 of the switch for writing, a lead wire 23, a-contact 24 of the switch for erasing, a resistance 25 of 10MΩ and a lead wire 26 to the lead wire 12. A writing member 20 and an erasing member 27 were separately provided. The writing member 20 was made of a conductive sponge ("MOSPAC P", a product of FUJIMORI KOGYO CO., LTD.) having a volume resistivity of $5\times10^4$ Ω.cm at 50% RH in 23° C. air, whereas the erasing member 27 was made of a conductive sponge ("MOSPAC GS", a product of FUJIMORI KOGYO CO., LTD.) having a volume resistivity of $4\times10^3$ 106 .cm at 50% RH in 23° C. air.

A timer circuit (not shown) of about a five-minute shut-off time is incorporated as an automatic power-off device between the U-3 type 1.5 v drycell and the power source 9.

The switch 28 for writing comprises the a-contact 16 and the b-contact 22 which link with each other to form an interlock mechanism. The switch 31 for erasing comprises the b-contact 18 and the a-contact 24 which link with each other to form an interlock mechanism. In the usual state, the b-contact 18 of the switch for erasing and the b-contact 22 of the switch for writing are in the connected state, respectively, whereas the a-contact 16 of the switch for writing and the a-contact 24 of the switch for erasing are in the disconnected state, respectively.

As described heretofore, the hand-writable liquid crystal board set of this embodiment was prepared.

(c) Writing operation

Pressing the switch 28 for writing by the left hand (with touching the contact type surface electrode 32 of the switch for writing), an operator drew lines on a board screen 29 with the writing member 20 held in the right hand. By this, a recorded image 30 was obtained.

(d) Erasing operation:

Pressing the switch 31 for erasing by the left hand (with touching the contact type surface electrode 33 of the switch for erasing), the operator traced the recorded image 30 with the erasing member 27 held in the right hand and erased the image.

In writing and erasing, the operator's body naturally plays a role to electrically connect the contact type surface electrode 32 of the switch for writing with the writing member 20, and the contact type surface electrode 33 of the switch for erasing with the erasing member 27, respectively.

(e) Safety

In the board set of this embodiment, pressing the switch 28 for writing brings the a-contact 16 of the switch for writing into the connected state, which electrically connects the terminal 14 with the contact type surface electrode 32 of the switch for writing. As a result, a voltage arises between the conductive layer 3 and the contact type surface electrode 32. At this time, the contact type surface electrode 32 and the writing member 20 held in the hand are connected through the human body, so that the contact type surface electrode 32 is equipotential with the writing member 20. As a result, in a usual writing operation, a voltage arises between the conductive layer 3 and the writing member 20, enabling the writing and/or drawing operation onto the liquid crystal board 1. Meanwhile the b-contact 22 of the switch for writing and the a-contact 24 of the switch for erasing are respectively in the disconnected state, so that the contact type surface electrode 33 of the switch for erasing is electrically disconnected from the terminal 10. Therefore, no voltage can arise between the contact type surface electrode 32 of the switch for writing and the contact type surface electrode 33 of the switch for erasing while the switch 28 for writing being pressed. Accordingly, no electric shock was felt by an operator when the operator touched the contact type surface electrode 33 of the switch for erasing while pressing the switch 28 for writing.

With the switch 31 for erasing being pressed, the a-contact 24 of the switch for erasing is brought into the connected state, which electrically connects the conductive layer 3 with the contact type surface electrode 33 of the switch for erasing. At this time, the contact type surface electrode 33 and the erasing member 27 held in the hand are connected through the human body, so that the contact type surface electrode 33 is equipotential with the erasing member 27. As a result, in a usual erasing operation, the conductive layer 3 and the erasing member 27 are equipotential. Therefore, the static charges in the recorded image portion can be removed by tracing the board screen 29 with the erasing member 27, enabling the erasing of the recorded image 30. Meanwhile, the a-contact 16 of the switch for writing and the b-contact 18 of the switch for erasing are respectively in the disconnected state, so that the contact type surface electrode 32 of the switch for writing is electrically disconnected from the terminal 14. Therefore, no voltage can arise between the contact type surface electrode 33 of the switch for erasing and the contact type surface electrode 32 of the switch for writing while the switch 31 for erasing is being pressed. Accordingly, no electric shock was felt by an operator when the operator touched the contact type surface electrode 32 of the switch for writing simultaneously with pressing the switch 31 for erasing.

When both the switch 28 for writing and the switch 31 for erasing are pressed at the same time, both the b-contact 18 of the switch for erasing and the b-contact 22 of the switch for writing are brought into the disconnected state. Accordingly, electrical disconnections are kept between the terminal 14 and the contact type surface electrode, 32 of the switch for writing, and between the terminal 10 and the contact type surface electrode 33 of the switch for erasing, respectively.

Therefore, no electric shock was felt by the operator when the operator pressed both the switch 28 for writing and the switch 31 for erasing simultaneously since no voltage would arise between the contact type surface electrode 32 of the switch for writing and the contact type surface electrode 33 of the switch for erasing.

Still, no shock was felt by the operator when both the charged board screen 29 and the contact type surface electrode 33 of the switch for erasing were touched by the hands of the operator at the same time. This is because the existence of resistances 25 and 13 between the contact type surface electrode 33 of the switch for erasing and the conductive layer 3 inhibits the current between the contact type surface electrode 33 of the switch for erasing and the board screen 29 not more than 30 µA.

Moreover, consideration was made for a case in which the conductive layer 3 of the liquid crystal board 1 was exposed outside. In this case, no shock was felt by the operator when both the contact type surface electrode 32 of the switch for writing and the exposed portion of the conductive layer 3 were touched by the hands of the operator at the same time. This is because the existence of resistances 13 and 11 between the conductive layer 3 and the power source 9 inhibits the current between the contact type surface electrode 32 of the switch for writing and the conductive layer 3 to not more than 30 µA.

(f) Power saving

In the board set of this example, an automatic power off device is provided. Therefore, if the hand-writable liquid crystal board set is left with the power switch on, the power can be automatically cut off after a predetermined period of time, thus avoiding waste of electric energy.

Thus, a hand-writable liquid crystal board set of power saving type has been completed in which displaying and erasing operations can be repeatedly carried out from the outside of the board screen in a simple manner, which assures such high safety that no electric shock would harm the operator under any foreseeable circumstances. In addition the set has great durability, free from troubles such as entanglement or disconnections of cords, since no cord is employed.

Example 3

(a) Preparation of a liquid crystal display device of the externally charging type:

A liquid crystal display device of the externally charging type 1 was prepared in the similar manner with example 1 except that a polyethylene terephthalate film of 2 μm thick ("KX43-4 2.OW", a product of Diafoil Co.,Ltd.) was laminated as a transparent high-electric resistance layer 4 on the same conductive layer 3 in example 1.

The following volume resistivity of the layer was obtained in a similar measurement as in example 1.

| | | |
|---|---|---|
| Transparent high-electric resistance layer | $7.5 \times 10^{14}$ | Ω•cm |

(b) Preparation of a hand-writable liquid crystal board set:

A hand-writable liquid crystal board set was prepared as the same manner in example 1 by using the above liquid crystal display device of the externally charging type as a liquid crystal board 1.

Example 4

(a) Preparation of a liquid crystal display device of the externally charging type:

A liquid crystal display device of the externally charging type 1 was prepared in the similar manner with example 1. A solution having the following composition was applied on the surface of the transparent insulator layer 8 of the device as a dirt-protecting film (not shown) so as to be 3 μm thick after drying. Then the solution was dried and cured.

| | |
|---|---|
| Polyol ("CEFRAL COAT A-201TB" made by CENTRAL GLASS CO., LTD.) | 9.0 g |
| Hexamethylene diisocyanate isocyanurate (polyisocyanate: made by CENTRAL GLASS CO., LTD.) | 1.0 g |
| Ethyl acetate | 16.0 g |

(b) Preparation of a hand-writable liquid crystal board set:

A hand-writable liquid crystal board set was prepared as the same manner in example 1 by using the above liquid crystal display device of the externally charging type as a liquid crystal board 1.

Example 5

(a) Preparation of a liquid crystal display device of the externally charging type:

A liquid crystal display device of the externally charging type 1 was prepared in a similar manner with example 1 except that applied on the same transparent high-electric resistance layer 4 with that of example 1, was a liquid crystal-dispersed polymer layer 7 with a dry film thickness of 7 μm. Then the solution was dried and cured.

| | |
|---|---|
| Polyvinyl acetal (KS-1 made by Sekisui Chemical Co., Ltd.) 10% in ethyl acetate solution | 2.1 g |
| Polyisocyanate ("TAKENATE D11ON" made by Takeda Chemical Industries, Ltd,) | 0.3 g |
| Nematic liquid crystal ("E44" made by MERCK Co.,) | 0.2 g |

The following volume resistivity of the layer was obtained in the similar measurement as in example 1.

| | | |
|---|---|---|
| Liquid crystal-dispersed polymer layer | $1.3 \times 10^{14}$ | Ω•cm |

(b) Preparation of a hand-writable liquid crystal board set:

A hand writable-liquid crystal board set was prepared as the same manner in example 1 by using the above liquid crystal display device of the externally charging type as a liquid crystal board 1.

Example 6

(a) Preparation of a liquid crystal display device of the externally charging type:

A polyethylene terephthalate film 12 μm thick ("LUMIRROR", a product of Toray Industries Inc.) was laminated as a transparent high-electric resistance layer 4 on the same conductive layer 3 in example 1, and a solution having the following composition is applied on said transparent high-electric resistance layer 4 as a liquid crystal-dispersed polymer layer 7 with a dry film thickness of 7 μm. Then the solution was dried and cured.

| | |
|---|---|
| Polyvinyl acetal ("KS-1 made by Sekisui Chemical Co., Ltd.) 10% in ethyl acetate solution | 4.2 g |
| Polyisocyanate ("TAKENATE D11ON" made by Takeda Chemical Industries, Ltd.) | 0.56 g |
| Nematic liquid crystal ("E44" made by MERCK Co.,) | 0.36 g |

Laminated on the above liquid crystal-dispersed polymer layer was a transparent insulator layer 8 with 6 μm in thickness of polyethylene terephthalate film ("TETRON film F" made by TEIJIN LIMITED) using an one-part cross-linking type acrylic adhesive ("SK DYNE 100" made by Soken Chemical & Engineering Co,. Ltd.) to complete a liquid crystal display device of the externally charging type 1.

(b) Preparation of a hand-writable liquid crystal board set:

A hand-writable liquid crystal board set was prepared as the same manner in example 1 by using the above liquid crystal display device of the externally charging type as a liquid crystal board 1.

Examples 7–8

A liquid crystal display device of externally charging type 1 was prepared in the similar manner with example 5 except that the thickness of the polyethylene terephthalate film was 25 n μm (Example 7) or 50 μm (Example 8).

Comparative example 1

(a) Preparation of a liquid crystal display device of the externally charging type:

A liquid crystal display device of the externally charging type 1 was prepared in a similar manner with example 1 except that no transparent high-electric resistance layer 4 was provided on the conductive layer 3.

(b) Preparation of a hand-writable liquid crystal board set:

A hand-writable liquid crystal board set was prepared as the same manner in example 1 by using the above liquid crystal display device of the externally charging type as a liquid crystal board 1.

Comparative example 2

(a) Preparation of a liquid crystal display device of the externally charging type:

Applied on the same conductive layer 3 with that of example 1 was a mixture of a composition listed below to form a liquid crystal dispersed polymer layer.

A polyethylene terephthalate film of 9 μm thick ("TETRON film F", a product of TEIJIN LIMITED) was pressed as a transparent insulator layer 8 over the above applied film. The film side of the device was exposed by a UV-irradiating apparatus for one minute such that light-curing occurred whereby a liquid crystal-dispersed polymer layer 7 was formed. Thus a liquid crystal display device of the externally charging type was prepared.

| | |
|---|---|
| Epoxyacrylate ("ARONIX M210", a product by Toagosei Chemical Industry Co.,Ltd.) | 1.2 g |
| 2-ethylhexylacrylate | 1.8 g |
| Benzoin-isopropylether | 0.06 g |
| Nematic liquid crystal ("E7" made by MERCK Co.) | 7.0 g |
| Sphere particles of 12 μm in diameter ("MBX-12S" made by SEKISUI PLASTICS Co., Ltd.) | 0.005 g |

The volume resistivity of the layer below was obtained in the similar measurement as in example 1.

Liquid crystal-dispersed polymer layer $5.6 \times 10^9$ Ω.cm (b) Preparation of a hand-writable liquid crystal board set:

A hand-writable liquid crystal board set was prepared as the same manner in example 1 by using the above liquid crystal display device of the externally charging type as a liquid crystal board 1.

Comparative example 3

(a) Preparation of a liquid crystal display device of the externally charging type:

A liquid crystal display device of the externally charging type 1 was prepared in the similar manner as in example 1, except in that an aqueous solution of polyvinyl alcohol ("Gohsenol GH-17", a product by The Nippon Synthetic Chemical Industry Co., Ltd.) was applied and then dried in place of the transparent high-electric resistance layer 2 so as to be 2 μm in thick after drying.

The volume resistivity of the polyvinyl alcohol layer was $2.1 \times 10^{13}$ Ω.cm at 90% RH in 20° C. air.

(b) Preparation of a hand-writable liquid crystal board set:

A hand-writable liquid crystal board set was prepared as the same manner in example 1 by using the above liquid crystal display device of the externally charging type as a liquid crystal board 1.

Comparative example 4

(a) Preparation of a liquid crystal display device of the externally charging type:

A liquid crystal display device of the externally charging type 1 was prepared in the similar manner with example 1 except that no transparent insulator layer 8 was provided.

(b) Preparation of a hand-writable liquid crystal board set:

A hand-writable liquid crystal board set was prepared as the same manner in example 1 by using the above liquid crystal display device of the externally charging type as a liquid crystal board 1.

Comparative example 5

(a) Preparation of a liquid crystal display device of the externally charging type:

A liquid crystal display device of the externally charging type 1 was prepared in the similar manner as in example 1, except that a solution of the following composition was applied on the same transparent high-electric resistance layer 4 with that of example 1, as the liquid crystal-dispersed polymer layer 7 so as to be 7 μm thick after dried. Then the solution was dried and cured.

| | |
|---|---|
| Polyvinylformal ("VINYLEC K-624" made by CHISSO CORPORATION) 10% in tetrahydrofuran solution | 4.0 g |
| Polyisocyanate ("TAKENATE D11ON" made by Tadeda Chemical Industries, Ltd.) | 0.53 g |
| Nematic liquid crystal ("E44" made by MERCK Co,) | 1.2 g |

The volume resistivity of the layer below was obtained in the similar measurement as in example 1.

| | | |
|---|---|---|
| Liquid crystal-dispersed polymer layer | $1.2 \times 10^{12}$ | Ω•cm |

(b) Preparation of a hand-writable liquid crystal board set:

A hand-writable liquid crystal board set was prepared as the same manner in example 1 by using the above liquid crystal display device of the externally charging type as liquid crystal board 1.

Comparative example 6

(a) Preparation of a liquid crystal display device of the externally charging type:

A liquid crystal display device of the externally charging type 1 was prepared in the similar manner with example 1 except that a cellophane film 21 μm thick was laminated in place of the transparent insulator layer 8 on the same liquid crystal-dispersed polymer layer 7 in example 1.

The volume resistivity of the cellophane was $3.6 \times 10^{10}$ Ωcm at 90% RH in 20° C. air.

(b) Preparation of a hand-writable liquid crystal board set:

A hand-writable liquid crystal board set was prepared as in example 1 by using the above liquid crystal display device of the externally charging type as liquid crystal board 1.

Comparative example 7

(a) Preparation of a liquid crystal display device of the externally charging type:

A liquid crystal display device of the externally charging type 1 was prepared in the similar manner with comparative example 3 except that the cellophane film 21 μm thick was laminated in place of the transparent insulator layer 8 on the same liquid-dispersed polymer layer 7 in comparative example 3.

(b) preparation of a hand-writable liquid crystal board set:

A hand-writable liquid crystal board set was prepared as the same manner in example 1 by using the above liquid crystal display device of the externally charging type as a liquid crystal board 1.

Comparative example 8

(a) Preparation of a liquid crystal display device of the externally charging type:

A liquid crystal display device of the externally charging type 1 was prepared in the similar manner as in example 1, except in that a solution of polyvinylformal ("DENKAFORMAL #20" made by DENKI KAGAKU KOGYO KABUSHIKI KAISHA) 10% in tetrahydrofuran was applied and then dried in place of the transparent high-electric resistance layer 4 so as to be 3 μm thick after drying.

The volume resistivity of the polyvinylformal layer was $2.3 \times 10^{13}$ Ω.cm at 90% RH in 20" air.

(b) Preparation of a hand-writable liquid crystal board set:

A hand-writable liquid crystal board set was prepared as the same manner in example 1 by using the above liquid crystal display device of the externally charging type as a liquid crystal board 1.

In Comparative Example 8, when a liquid crystal-dispersed polymer layer was coated on a polyvinylformal film, the polyvinylformal film interacted with the liquid crystal-dispersed polymer layer and the white-cloudiness of the liquid crystal-dispersed polymer layer deteriorated. As a result, it was not possible to obtain a clear recorded image by carrying out writing on a board display and image memory retention and erasability could not be evaluated. This is considered attributable to the fact that the polyvinylformal does not have a cross-linked structure.

Comparative Examples 9–10

A liquid crystal display device of the externally charging type 1 was prepared in the similar manner with example 5 except that a polyethylene terephthalate film of 100 μm (Comp. Ex. 9) or 125 μm (Comp. Ex. 10) thick was laminated in place of the high-electric resistance layer 4.

The following items (1)–(5) were evaluated for each hand-writable liquid crystal board set of the above examples 1–5 and comparative examples 1–8. The results of the evaluation are shown in Table 1.

(1) Recording performance:

Each hand-writable liquid crystal board set was left in an environment having a relative humidity (to be abbreviated as RH) of 90% in 20° C. air, to absorb moisture. With each of the thus dampened sets, an operator drew a recording image 30 on the board screen 29 with the writing member 20 while the switch 28 for writing was being pressed. Then the difference of the optical density (O.D.) between the image area and the imagefree area was measured using a Macbeth density-meter (RD-915 type).

Optical density test method:

After adjusting the filter to "black" on the Macbeth Reflection Densitometers (RD-915), press the aperture of the reflection head directly to the recorded image 30 on the board screen 29 and measure the Optical density (O.D.) on the image area. Operate in the same manner and measure the Optical density (O.D.) on the image-free area and obtain the difference.

Good: The difference of O.D. value between the image area and the image-free area is 0.4 or more.

Bad: The difference of O.D. value between the image area and the image-free area is less than 0.4.

(2) Image retention memory performance

Each of the hand-writable liquid crystal board set with the image 30 was left at 90%RH in 20° C. air, and the image retention time of the recorded image 30 was measured.

Good: The image is retained for 30 minutes or longer with keeping the difference of O.D. value between the image area and the image-free area at or over 0.4.

Medium: The image is retained for at least 10 minutes and less than 30 minutes with keeping the difference of O.D. value between the image area and the image-free area at or over 0.4.

Bad: The image is retained for less than 10 minutes with keeping the difference of O.D. value between the image area and the image-free area at or over 0.4.

(3) Erasability

Each hand-writable liquid crystal board set was left in a 20° C. air at 90% RH, to absorb the moisture. With each of the thus dampened sets, an operator drew a recording image 30 on the board screen 29 with the writing member 20 while the switch 28 for writing was being pressed. Then the recorded image 30 was erased by tracing it with the erasing member 27 while the switch 31 for erasing was being pressed.

Good: The image area erased can hardly be seen (The 0.D value of the erased area is less than the O.D. value of the image-free area plus 0.05.)

Bad: The image area erased is clearly visible (The 0.D value of the erased area is the O.D. value of the image-free area plus 0.05 or more.)

-: impossible to evaluate (4) Strength of the board

Each liquid crystal board was rubbed on its surface with a material having a pencil strength of 2H, and the damage was observed.

Good: No damage

Bad: The liquid crystal-dispersed layer is peeled off and damaged.

(5) Dirt-protecting performance

Each of the hand-writable liquid crystal board sets had been left in a room environment for about one month while the writing and erasing operations were repeated.

Thereafter, the above items (2) Image retention memory performance and (3) Erasability was reevaluated.

Good: No deterioration in the image retention memory performance and erasability.

Bad: deterioration in the image retention memory performance and erasability is observed.

The results of these evaluations are shown in Table.1.

Figure 8:
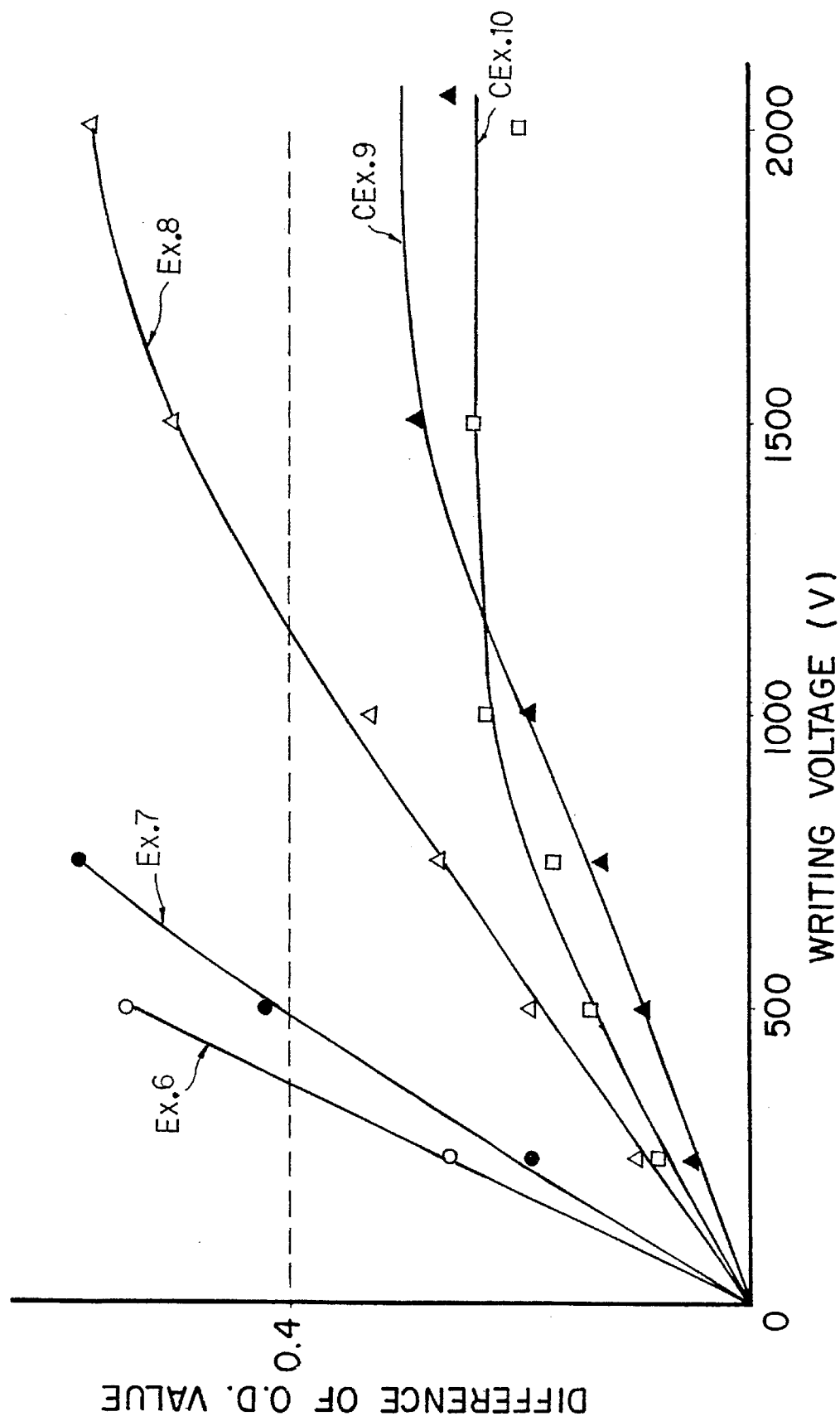
FIG. 8 and FIG. 9 are graphs showing the difference in optical density between an image area and an image-free area caused by a writing voltage.
Figure 9:
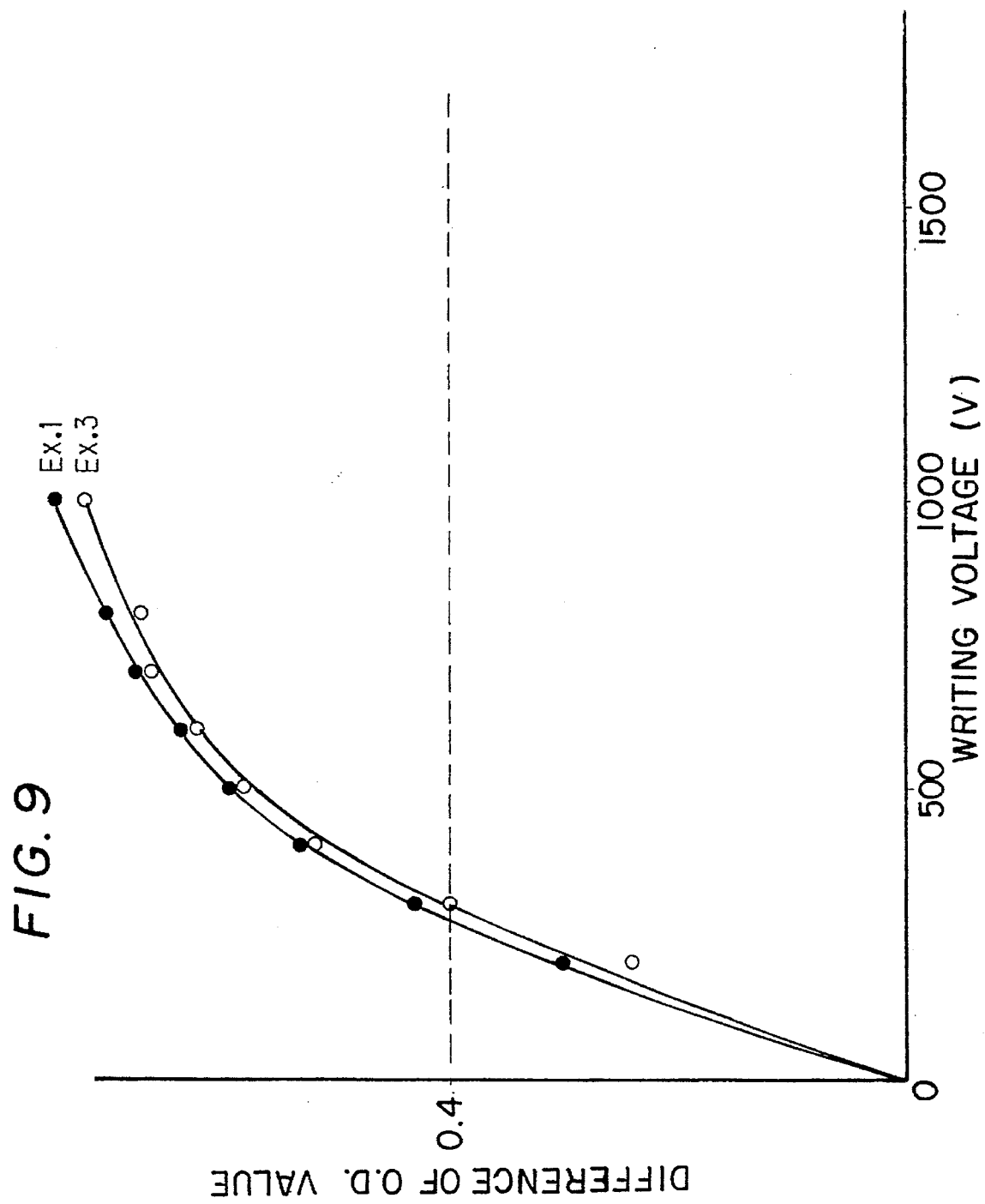

The following item (6) was evaluated for each hand-writable liquid crystal board set of the above examples 1, 3, 6, 7, 8 and comparative examples 9, 10. The difference of O.D. values between the image area and the image-free area correlated with the writing voltages is shown in FIG. 8 or 9.

(6) Image density (difference of O.D. values between an image area and an image free-area) caused by a writing voltage. One terminal of a direct current generator with a range of 0–2000 volts between terminals was connected through a conductive wire with the conductive layer 3 of the liquid crystal display device of the hand-writable liquid crystal board set, and the other terminal of direct current was connected through a conductive wire with the writing member comprising a conductive sponge (manufactured by FUJIMORI KOGYO Co., Ltd.: Mospac P) having a volume resistivity of $5 \times 10^4$ Ω.cm at 50% RH, 23° C.

When writing was carried out and a recorded image was drawn with the writing member at an optional voltage between 0–2000 voltages on the board display 29 of the hand-writable liquid crystal board set which was left in an environment having 90%RH, 20° C. and made damp, the difference of the density between the image area and the image-free area as to each writing voltage was measured using a Macbeth density-meter (RD-915type).

TABLE 1

|        | Recording performance | Image memory performance | Erasability | Strength of board | Dirt-protecting performance |
|--------|------|--------|------|------|------|
| Ex. 1  | Good | Good   | Good | Good | Bad  |
| Ex. 2  | Good | Good   | Good | Good | Bad  |
| Ex. 3  | Good | Good   | Good | Good | Bad  |
| Ex. 4  | Good | Good   | Good | Good | Good |
| Ex. 5  | Good | Good   | Good | Good | Bad  |
| CEx. 1 | Good | Medium | Bad  | Good | Bad  |
| CEx. 2 | Good | Bad    | Bad  | Good | Bad  |
| CEx. 3 | Good | Medium | Bad  | Good | Bad  |
| CEx. 4 | Good | Good   | Bad  | Bad  | Bad  |
| CEx. 5 | Good | Bad    | Bad  | Good | Bad  |
| CEx. 6 | Bad  | Bad    | —    | Good | Bad  |
| CEx. 7 | Bad  | Bad    | —    | Good | Bad  |
| CEx. 8 | impossible to evaluate | | | | |

Ex: Example;
CEx: Comparative example

What we claim is:

1. A liquid crystal display device of the externally charging type comprising:

a conductive layer;

a transparent high-electric resistance layer having a thickness of 0.1 to 50 μm and volume resistivity of $10^{13}$ Ω.cm or more in 20° C. air at a relative humidity of 90%;

a liquid crystal-dispersed polymer layer in which liquid crystal is finely dispersed in a polymer matrix, said layer having a volume resistivity of $10^{13}$ Ω.cm or more in 20° C. air at a relative humidity of 90%; and a transparent insulator layer having a volume resistivity of $10^{13}$ Ω.cm or more in 20° C. air at a relative humidity of 90%; wherein all of said layers are successively layered in the order presented.

2. The liquid crystal display device of the externally charging type according to claim 1, wherein said high-electric resistance layer comprises a polymer having a cross-linked structure or a polymer film.

3. The liquid crystal display device of the externally charging type according to claim 2, wherein said cross-linked polymer of said transparent high-electric resistance layer is formulated from a reaction between di- or poly-isocyanate and polyvinylacetal.

4. The liquid crystal display device of the externally charging type according to claim 1, wherein the polymer matrix of said liquid crystal-dispersed polymer layer is composed of a polymer having a cross-linked structure.

5. The liquid crystal display device of the externally charging type according to claim 1, wherein said polymer matrix of said liquid crystal-dispersed polymer layer comprises a cross-linked polymer formulated from a reaction between di- or poly-isocyanate and polyvinylacetal.

6. A hand-writable liquid crystal board set comprising:

(A) a liquid crystal board of the externally charging type:
    a conductive layer; a transparent high-electric resistance layer having a thickness of 0.1–50 μm and a volume resistivity of $10^{13}$ Ω.cm or more in 20° C. air at a relative humidity of 90%; a liquid crystal-dispersed polymer layer in which liquid crystal is finely dispersed in a polymer matrix, said liquid crystal dispersed polymer layer having a volume resistivity of $10^{13}$ Ω.cm or more in 20° C. air at a relative humidity of 90%; and a transparent insulator layer having a volume resistivity of $10^{13}$ Ω.cm or more in 20° C. air at a relative humidity of 90%, wherein all of said layers are successively layered in the order presented;

(B) display means for displaying recording images onto the board surface of said liquid crystal board, and erasing means for erasing said recorded images; and (C) a power source for generating a surface potential between the surface of said liquid crystal board and said conductive layer by said display means;

wherein said display means employs a writing member electrically connected to one terminal of said power source which is connected at the other terminal thereof to said conductive layer; and said erasing means employs an erasing member electrically connected to said conductive layer.

7. The hand-writable liquid crystal board set according to claim 6, wherein said high-electric resistance layer comprises a polymer having a cross-linked structure or a polymer film.

8. The hand-writable liquid crystal board set according to claim 7, wherein said cross-linked polymer of said transparent high-electric resistance layer is formulated from a reaction between di- or poly-isocyanate and polyvinylacetal.

9. The hand-writable liquid crystal board set according to claim 6, wherein the polymer matrix of said liquid crystal-dispersed polymer layer is composed of a polymer having a cross-linked structure.

10. The hand-writable liquid crystal board set according to claim 6, wherein said polymer matrix of said liquid crystal-dispersed polymer layer comprises a cross-linked polymer formulated from a reaction between di- or poly-isocyanate and polyvinylacetal.

11. The hand-writable liquid crystal board set according to claim 6, wherein a lead wire which electrically connects said power source with said writing member, said writing member itself, a lead wire which electrically connects said conductive layer with said erasing member, and said erasing member itself all have a respective volume resistivity of $10^{12}$ Ω.cm or less in 23° C. air at a relative humidity of 50%.

12. The hand-writable liquid crystal board set according to claim 6, wherein an electric resistance of 200KΩ to 100MΩ is electrically connected at least between one terminal of said power source and said conductive layer, between one terminal of said power source and said erasing member and between said conductive layer and said erasing member.

13. The hand-writable liquid crystal board set according to claim 6, wherein an electric circuit including said display means and said erasing means is equipped with an interlock device for preventing the occurrence of electric shocks.

14. The hand-writable liquid crystal board set according to claim 6, wherein an electric circuit including said display means and said erasing means is equipped with an automatic power-off device.

15. The hand-writable liquid crystal board set according to claim 6, wherein the board surface of said board, or said writing member and said erasing member have been subjected to a dirt-protection treatment.

16. The hand-writable liquid crystal board set according to claim 15, wherein said dirt-protection treatment on said board surface has a hard coating having abrasion-resistance.

17. The hand-writable liquid crystal board set according to claim 16, wherein said hard coating comprises at least one resin selected from the group consisting of thermosetting silicone resin, thermosetting fluororesin and acrylic resin.

18. The hand-writable liquid crystal board set according to claim 6, wherein said writing member and/or said erasing member comprises a film-like or sheet-like substrate having a pattern of a conductive material formed thereon.

* * * * *